(12) United States Patent
Hutzl et al.

(10) Patent No.: US 7,844,931 B2
(45) Date of Patent: Nov. 30, 2010

(54) METHOD AND COMPUTER SYSTEM FOR OPTIMIZING THE SIGNAL TIME BEHAVIOR OF AN ELECTRONIC CIRCUIT DESIGN

(75) Inventors: Guenther Hutzl, Bonn (DE); Stephan Held, Bonn (DE); Juergen Koehl, Weil im Schoenbuch (DE); Bernhard Korte, Bonn (DE); Jens Massberg, Bonn (DE); Matthias Ringe, Bonn (DE); Jens Vygen, Bonn (DE)

(73) Assignee: International Business Machines Corporation, Armonk, NY (US)

( * ) Notice: Subject to any disclaimer, the term of this patent is extended or adjusted under 35 U.S.C. 154(b) by 377 days.

(21) Appl. No.: 12/032,728

(22) Filed: Feb. 18, 2008

(65) Prior Publication Data
US 2008/0216042 A1 Sep. 4, 2008

(51) Int. Cl.
*G06F 17/50* (2006.01)
(52) U.S. Cl. .............................. 716/6; 716/2
(58) Field of Classification Search ............ 716/2, 716/6
See application file for complete search history.

(56) References Cited
U.S. PATENT DOCUMENTS
6,625,787 B1 * 9/2003 Baxter et al. .................... 716/6
6,751,786 B2 * 6/2004 Teng et al. ..................... 716/18
7,475,374 B1 * 1/2009 Johnson et al. ................ 716/10
7,512,925 B2 * 3/2009 Birmiwal et al. .............. 716/18
7,707,529 B2 * 4/2010 Endres et al. ................... 716/6
2005/0268263 A1 * 12/2005 Sun et al. ........................ 716/6
2008/0163147 A1 * 7/2008 Gregerson et al. ............. 716/6
2008/0201683 A1 * 8/2008 Habitz et al. ................... 716/14
2008/0216040 A1 * 9/2008 Furnish et al. ................. 716/10

OTHER PUBLICATIONS
Clock Scheduling and Clocktree Construction for High Performance ASICS, Held, et al., pp. 232-240, Nov. 11-23, 2003.

* cited by examiner

*Primary Examiner*—Stacy A Whitmore
(74) *Attorney, Agent, or Firm*—Richard M. Kotulak (57) ABSTRACT

A method and program for designing an electronic circuit, especially a clock tree and a sub-clock tree, within a set of sinks with given target arrival time windows, preferably on an integrated circuit. The clock tree and the sub-clock tree are preferably connected through one or multiple fixed circuits which must not be altered, cloned or removed. Several alternative implementations of the at least one logic structure are built and for each of the several alternative implementations data is stored. A set of configurations is built, each configuration comprising a combination of the one or several alternative implementations and each configuration satisfying the target arrival time windows at the complete set of sinks. A configuration is selected according to an evaluation of the data, preferably latency data, for constructing the configuration. No manual interaction is needed and a configuration with minimum latencies is provided.

9 Claims, 6 Drawing Sheets

METHOD AND COMPUTER SYSTEM FOR OPTIMIZING THE SIGNAL TIME BEHAVIOR OF AN ELECTRONIC CIRCUIT DESIGN

CROSS-REFERENCES TO RELATED APPLICATIONS

This application is related to European Patent application Number 07103339.3, filed Mar. 1, 2007, and U.S. patent application Ser. No. 12/032,734, filed Feb. 18, 2008. All related Applications referenced above have common inventors and are assigned to the same assignee.

BACKGROUND OF THE INVENTION

The present invention relates to the field of electronic circuit design and manufacture, especially to semiconductor circuits.

An integrated circuit ("IC") is a semiconductor device that includes many electronic components (e.g., transistors, diodes, inverters, etc.). These electrical components are interconnected to form larger scale circuit components (e.g., gates, cells, memory units, arithmetic units, controllers, decoders, etc.) on the IC.

Design engineers create an IC by transforming a circuit description of the IC into a geometric description called a "layout". To create an IC layout, design engineers typically use electronic design automation ("EDA") applications. These EDA applications provide sets of computer-based tools for creating, editing, and analyzing IC design layouts. EDA applications create layouts by using geometric shapes that represent different materials and devices on integrated circuits.

Due to the increase of clock frequencies and design sizes clock tree construction has become a challenging problem in the design of ICs. Clock trees are also described as clock distribution networks which distribute clock signals from a root or source to all sinks that need it. Roots are typically the pins of any kind of logic gates including PLLs (Phase Locked Loops). Sinks are typically the clock pins of latches.

In order to ensure proper synchronization between various parts of an integrated circuit design each clock signal should reach all sinks on an integrated circuit at certain target arrival time windows. Thus, the time required for a clock signal to travel from its root to any sink should hit the target arrival time window for all paths it follows through the global clock tree. The time required for a clock signal to work its way through the global clock tree from its root to a sink depends on many factors, such as the length of conductors in the path, the number of buffers the clock signal must pass through, the switching delay of each buffer, the amount of attenuation which the clock signal incurs between the buffer stages, and the load each buffer must drive.

A typical application of clock tree construction is in the design of ASICs (Application Specific Integrated Circuit), for example. When producing an ASIC for a customer it is usual to insert test circuits in the ASIC design. The test circuits may not change the functional design of the ASIC. The test circuits are used during a manufacturing and bring-up process of a chip. In a manufacturing process they are used to separate error-free chips from bad ones. During a bring-up process test circuits are used to analyze error conditions etc. Then the problem exists, that the modified ASIC design comprising the additional test logic needs to be functionally equivalent to the ASIC design without the test logic.

For the equivalence check between two logic designs Boolean equivalence checker (BEC) tools exist, e.g. IBM Verity. However, such BEC tools can vary the equivalence of Boolean circuits only. Checker tools that are able to compare sequential logic circuits are still not ready for usage in today's design processes. A BEC tool needs to compare output signal values for equal input signal values between two designs. Therefore, a 1:1 mapping between the signal names of the two designs is required.

A specific approach to add additional test logic to an ASIC design is therefore one that introduces fixed circuits in clock trees, hence allowing a 1:1 mapping between two designs. A fixed circuit is a circuit that exists in a clock tree and must not be cloned or removed. It may be a fixed-in-location circuit in addition, in which case its placement must not be altered. Multiple fixed circuits and/or fixed-in-location circuits may exist in a clock tree. Generally, there are various reasons why fixed circuits in a clock tree are needed.

As mentioned above some chip test structures require certain circuits in a clock tree which may not be changed or removed. VMACs (virtual macros) are an example. VMACs are wrapper circuits that are introduced when using SRAM (static random access memory) circuits on an integrated circuit in the IBM Cu-65 technology. They implement special test structures that allow at-speed testing of the SRAM (Static Random Access Memory) circuits for example.

In another scenario, some parts of chip logic may be switched off during chip operation mainly to safe power. For such logic pieces simply the clock signal is switched off. This is done by gating circuits, usually AND or OR circuits. For these circuits it is required that they are not cloned because the gating signal will be created by some logic which is already optimized with respect to timing before clock tree construction. Therefore, it is not desired that clones of these circuits are created because this would have a negative impact on the timing of the gating signal. Also the placement of the gating circuits needs to be fixed because it is important that a gating circuit is placed close to the gating logic and the clock tree sinks, i.e. the fixed circuits are fixed-in-location circuits in this case.

Furthermore, in hierarchical designs the macro level input drivers are fixed circuits.

The general problem of constructing a configuration of at least one logic structure, preferably of clock tree construction, is the task of parallel and serial repowering of one or multiple logic structures such that the given target arrival time windows at all sinks are achieved. For zero-skew clock trees the target is to let the signal arrive at all sinks at the same time. In both cases this process is called "aligning". Further tasks are that all newly created buffers, inverters and circuits are placed legally, that limits for slew and capacity values are not exceeded and that the Boolean structure of a logic structure, preferably a clock tree, is not altered. Assumed that all these conditions are fulfilled it is a task to minimize the latency of the configuration.

Clock tree construction, especially in the presence of fixed circuits in between clock trees or clock tree parts usually is a difficult and manual task. With current methods a sub-clock tree after a fixed circuit is built separately. After the main clock tree has been built manual effort is needed to fix the skew between different clock trees that has been created by this approach.

For example, in Held S., Korte B., Maßberg J., Ringe M., Vygen J.: "Clock Scheduling and Clock Tree Construction for High Performance ASICs", Proceedings of the International Conference on Computer Aided Design, 2003, pp. 232-239, a method of building a clock tree and the calculation of the arrival times is disclosed. In the first part of the article a method for providing an optimally scheduled clock tree is introduced. Then the construction of the clock tree itself is performed in several iterations. Starting from the sinks of the skew-scheduled clock tree a new vertex of the clock tree to be constructed is generated as predecessor of an active vertex. The successors of the new vertex are computed using a greedy clustering strategy and will become inactive, i.e. their position is fixed. The predecessor itself will become an active vertex now. The iterations are terminated when all remaining active vertices can be connected to the source, i.e. the root of the clock tree.

BRIEF SUMMARY OF THE INVENTION

It is therefore an object of the invention to provide an improved method for generating an optimal configuration of a clock tree, in an effective manner. It is also an object of the invention to provide a corresponding computer program, computer program product and computer system for designing such a configuration.

The object is addressed by a method for optimizing the signal time behavior of an electronic circuit design comprising fixed circuit elements, wherein for a fixed circuit element at least one of the following conditions needs to be fulfilled for the optimization: it cannot be cloned, it cannot be removed, it cannot be modified, and wherein at least one tree of interconnected circuit elements is contained in said design, said tree being divided in a main tree and a sub tree, wherein said main tree and said sub tree do not comprise fixed circuit elements, and wherein said main tree and said sub tree are connected to each other via fixed circuit elements in said tree, the method comprising:

generating one or more alternative versions of said sub tree, wherein said alternative versions are Boolean equivalent to said sub tree, and wherein the target arrival time windows at the sinks of said sub tree are fulfilled for said alternative versions of said sub tree;

generating one or more alternative versions of said main tree, wherein said alternative versions of said main tree are Boolean equivalent to said main tree, and wherein the latencies for the fixed circuit elements connecting said main tree and said sub tree are taken into account for the generation, and wherein the target arrival time windows at the sinks of said main tree are fulfilled for said alternative versions of said main tree; and selecting the alternative versions of said main tree and the alternative versions of said sub tree with the minimum total signal arrival times.

Circuit elements in the sense of an embodiment of the present invention comprise the elements of a clock tree or a sub-clock tree, and buffer trees to be aligned within chip input/outputs, a part of an integrated circuit, etc. are possible. As a prerequisite for the method at least one of the sub-clock trees is driven by one or multiple fixed circuits. This means that the at least one of the sub-clock trees is connected to one or multiple fixed circuits at its root level. Possibly, a fixed circuit element can be fixed in location too, in which case its placement must not be altered.

Skew-scheduled tree structures with given target arrival time windows at the sinks in the sense of and embodiment of the present invention also comprise sinks with given target arrival times by presuming the window, i.e. the interval, is infinitely small.

For each configuration, the target arrival time windows at the sinks are satisfied provides an essential feature and means that only such configurations are considered which satisfy the target arrival time windows for the complete set of sinks as a necessary condition.

As mentioned above, in a preferred embodiment of the method a first logic structure is a clock tree and a second logic structure is a sub-clock tree.

Clock tree and sub-clock tree are terms which do not define different physical structures but are different due to their functional relationship. A clock tree, also described as main clock tree in the following, is followed by a sub-clock tree within an integrated circuit. The main clock tree and the sub-clock tree can be regarded as separate clock trees. Preferably, a fixed circuit is coupled between the clock trees, i.e. the main clock tree and the sub-clock tree.

The construction of a configuration while trying to satisfy the target arrival time windows for the complete set of sinks, requires maintaining the relative scheduled arrival time windows at the sinks for both clock trees, i.e. the main clock tree and the sub-clock tree, and is also known as "basining". According to an embodiment of the invention the method can also be called "auto-basining".

It is an advantage of the method and the program according to the present invention that no manual interaction is needed and a high degree of circuit design automation is achieved. Alternative sub-clock tree information is kept for the main clock tree construction and allows reacting to the inflexibility and the constraints of fixed circuits when generating implementations of a main clock tree. As a result the handling of multiple alternative implementations allows generating a configuration with a minimum latency.

In a further favorable embodiment of the invention the method comprises placing at least one of the fixed circuits in the center of its sinks. The center is the location for which the maximum distance between the fixed circuit and the sinks, also called Manhattan distance, is minimal. This location has to be electrically sound (e.g., no short circuits). If a fixed circuit is a fixed-in-location circuit then this step is not necessary because the placement of the fixed circuit may not be altered.

One or several alternative implementations comprise inserting and/or removing buffers and/or inverters and/or by duplication of non-buffers and/or non-inverters. A non-buffer and/or a non-inverter is for example an AND circuit or an OR circuit, which may be cloned.

In another preferred embodiment of the method, the data of the one or several alternative implementations and of each configuration comprises data of at least one of the following: allowable placement area of a fixed circuit, maximum slew values, power level limits, energy consumption limits, and/or maximum latencies.

Maximum slew value is defined as the maximum time rate of change of the input or output voltage for all possible input signals, usually measured between 10% and 90% of the amplitude.

The power level of a circuit is an indicator of how many circuits can be driven by this circuit. Usually the power level is used as a classified value.

Latency means the propagation time of a signal from a source to a sink of the configuration. The latency is uniform in case of zero-skew clock trees.

In a further favorable embodiment the evaluation of the data comprises the evaluation of the latency or the latencies, respectively, of each configuration and selecting a configuration with a minimum latency or with minimum latencies, depending on whether the clock trees are zero-skew clock trees.

Alternative implementations may differ for example in the following way: one implementation provides a low power level and a small latency and another implementation provides a higher power level but a higher latency.

The target arrival time windows of the set of skew-scheduled clock trees preferably comprise precise target arrival times.

In a further special embodiment the skew-scheduled clock tree is a zero-skew clock tree which implies that the target arrival times are equal for each sink.

A further favored embodiment of the method incorporates pruning techniques which are applied when selecting a configuration. This means for example that redundant or otherwise useless or unfavorable configurations are eliminated in an earlier step to accelerate the process of selecting a configuration. Pruning techniques and corresponding algorithms are known from the state of the art, see for example Blum C., Roli A.: "Metaheuristics in Combinatorial Optimization: Overview and Conceptual Comparison", ACM Computing Surveys, Vol. 35, No. 3, September 2003, pp. 268-308.

For example, the invention can be used for optimizing designs for ICs and printed circuit boards.

BRIEF DESCRIPTION OF THE DRAWINGS

The features and advantages of the present invention will be further understood from the following detailed description of the preferred embodiments without restricting the general inventive idea with reference to the accompanying schematic drawings to which we refer for all details not expressly explained in the text, wherein.

DETAILED DESCRIPTION OF THE INVENTION

Figure 1:
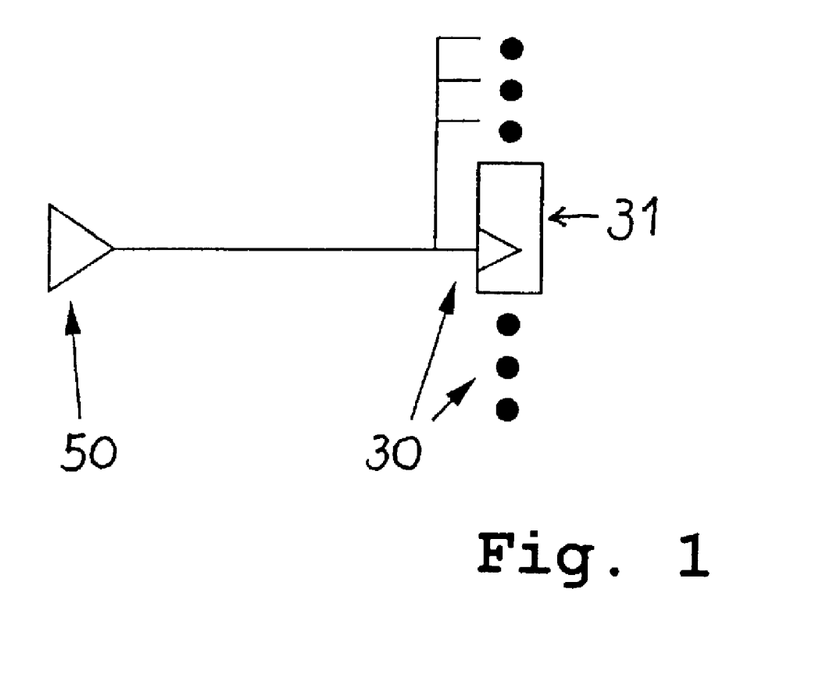
FIG. 1 shows a configuration before building a clock tree.

FIG. 1 shows a configuration before building a clock tree. The configuration comprises a root driver 50 and several sinks 30, symbolized by black dots, as well as a sink 31, which may be for example, a latch or a RAM.

Figure 2:
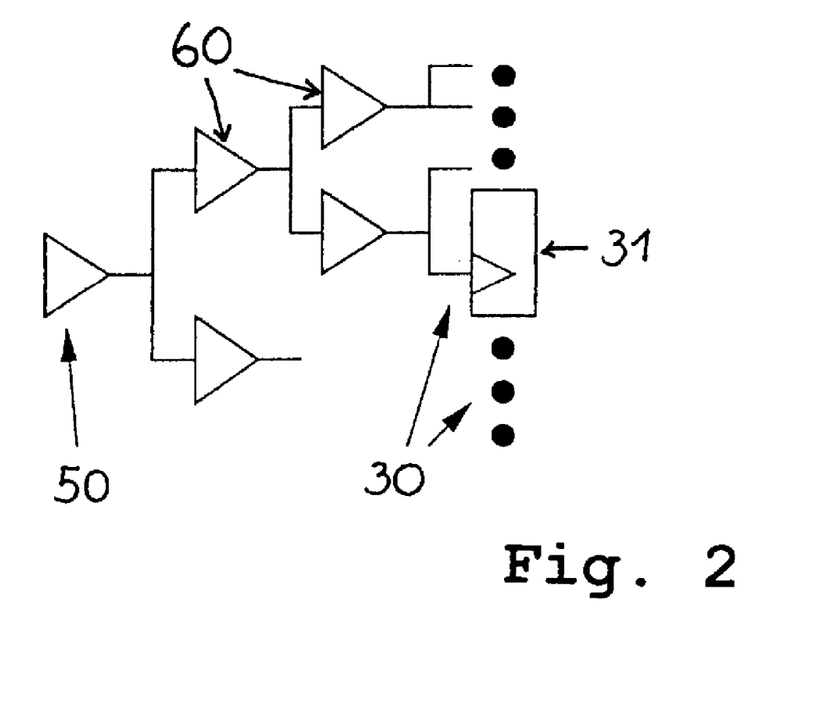
FIG. 2 shows a configuration after building a clock tree.

FIG. 2 shows a configuration after building a clock tree. A clock tree can have multiple roots though this is not illustrated in the figures. The parallel and serial repowering is typically performed by inserting buffers and/or inverters 60.

Generally, any circuit which is necessary in a clock tree and which has multiple inputs, e.g. a clock gating circuit, may be cloned. Algorithms for building zero-skew clock trees and skew-scheduled clock trees are known from Held S., Korte B., Maßberg J., Ringe M., Vygen J.: "Clock Scheduling and Clock Tree Construction for High Performance ASICs", Proceedings of the International Conference on Computer Aided Design, 232-239, 2003.

Figure 3:
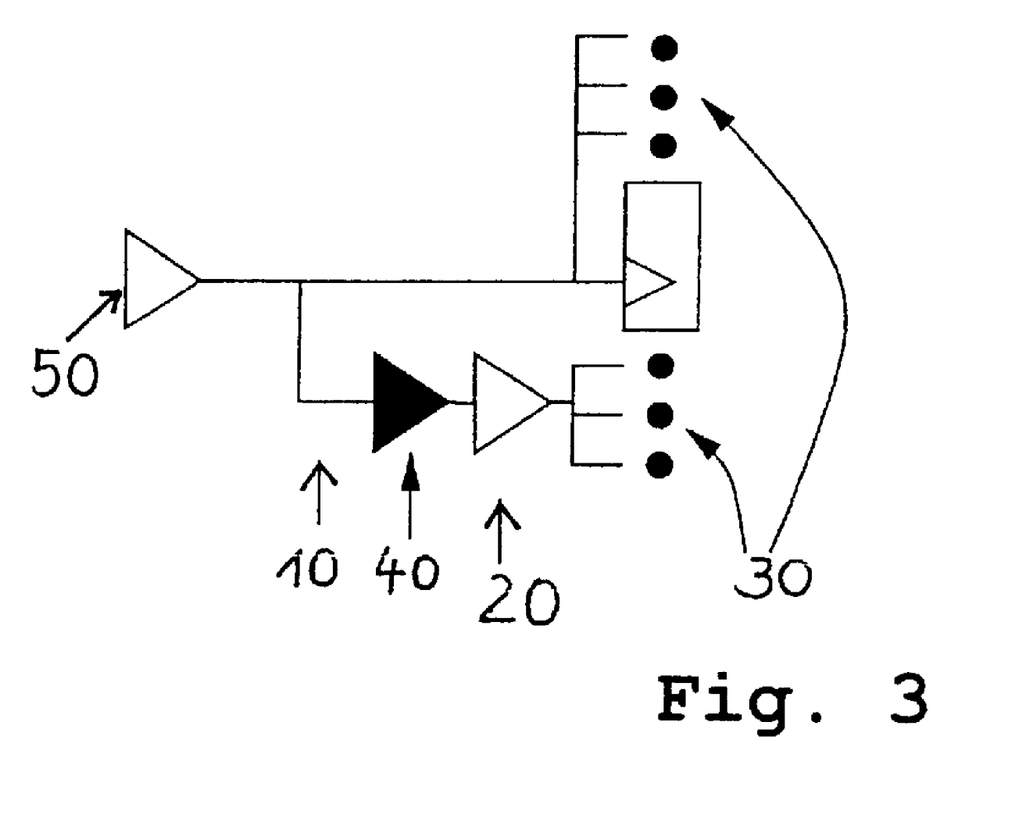
FIG. 3 shows a configuration incorporating a fixed circuit.

FIG. 3 shows a configuration which additionally incorporates a fixed circuit 40 which is arranged between a clock tree 10 to be built, also referred to as main clock tree, and a sub-clock tree 20.

FIGS. 4-9 are a comparison of a method according to the state of the art and an example of a method according to the invention in various steps. The following simplifications are presumed in order to focus on the basic different idea of the new method:

a. Zero-skew clock trees and sub-clock trees are built in the examples but generalization to skew-scheduled clock trees and sub-clock trees with given target arrival time windows at the sinks is possible;

b. The method which represents the state of the art shows alternative implementations which are restricted to inserting or eliminating buffers;

c. A configuration with only one sub-clock tree is shown but multiple sub-clock trees will be processed in a similar way; and d. The fixed circuits introduced in the examples are fixed-in-location circuits. Therefore, it is not necessary to include a step of placing the fixed circuits.

Figure 4:
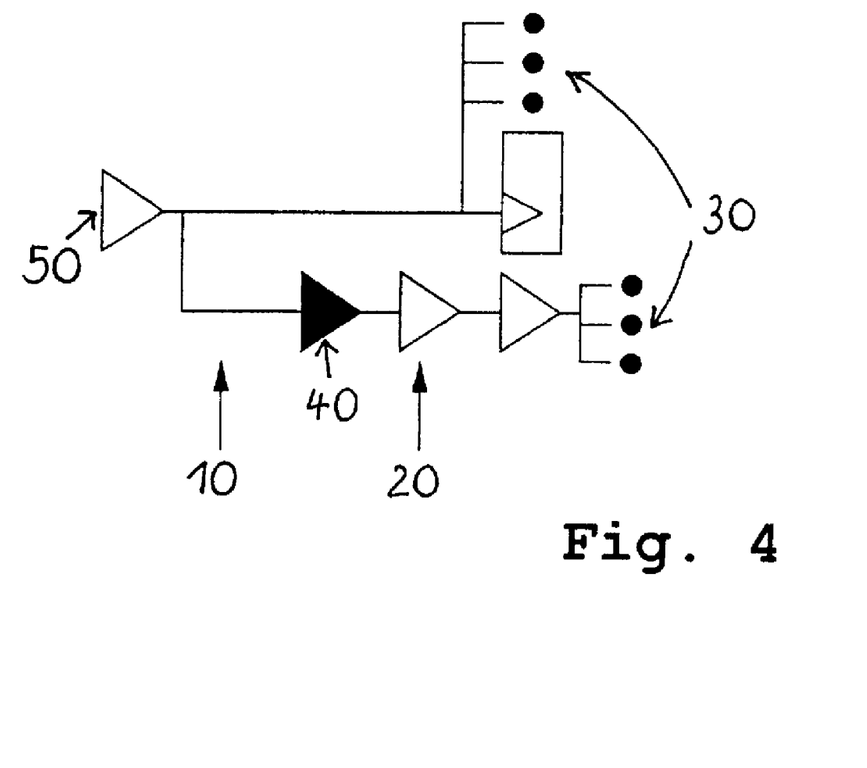
FIGS. 4, 5, 6A, and 6B illustrate a method of constructing a configuration in several steps according to the state of the art.

FIG. 4 shows a sub-clock tree 20 in its final version, i.e. the requirement of a zero-skew sub-clock tree is fulfilled. The sub-clock tree 20 must not be changed.

Figure 5:
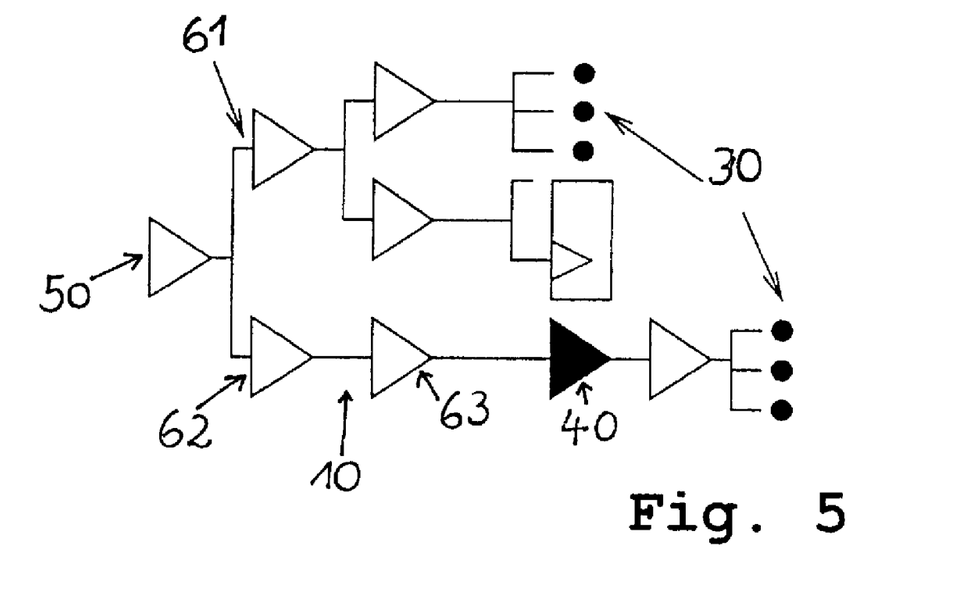

FIG. 5 shows the step of building the main clock tree 10. While building the main clock tree 10 the sub-clock tree 20 is considered as an additional sink of the main clock tree 10. The sinks 30 in the main clock tree 10 and in the sub-clock tree 20 are not balanced, i.e. the requirement of zero-skew clock tree and sub-clock tree is not fulfilled. There are two ways of fixing this defect: additional buffers can be added in front of the part of the main clock tree 10 which does not comprise the fixed circuit 40, i.e. to buffer 61. In an alternative way unwanted buffers, e.g. buffer 62 or buffer 63, can be removed.

Figure 6A:
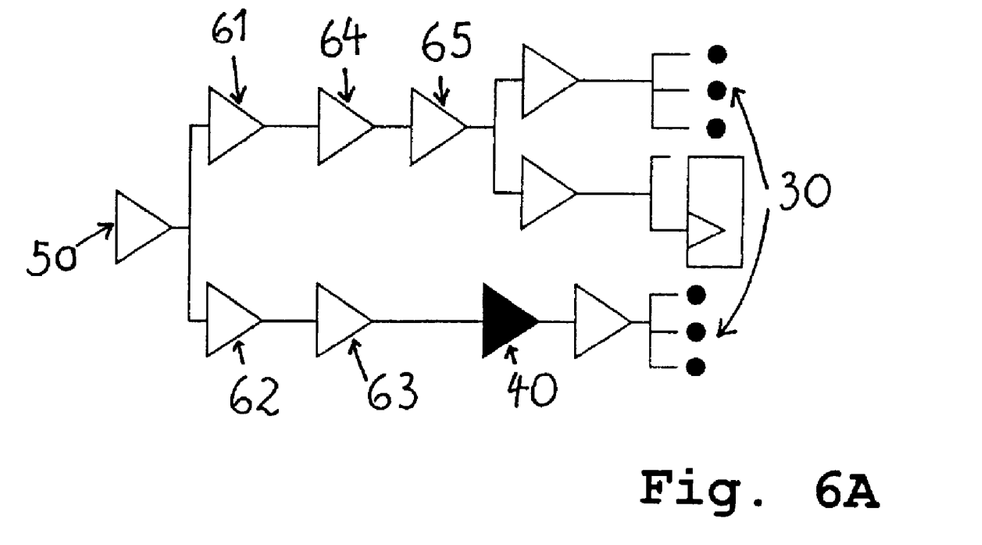

FIG. 6A shows a configuration according to the first alternative, i.e. two buffers 64, 65 are added.

Figure 6B:
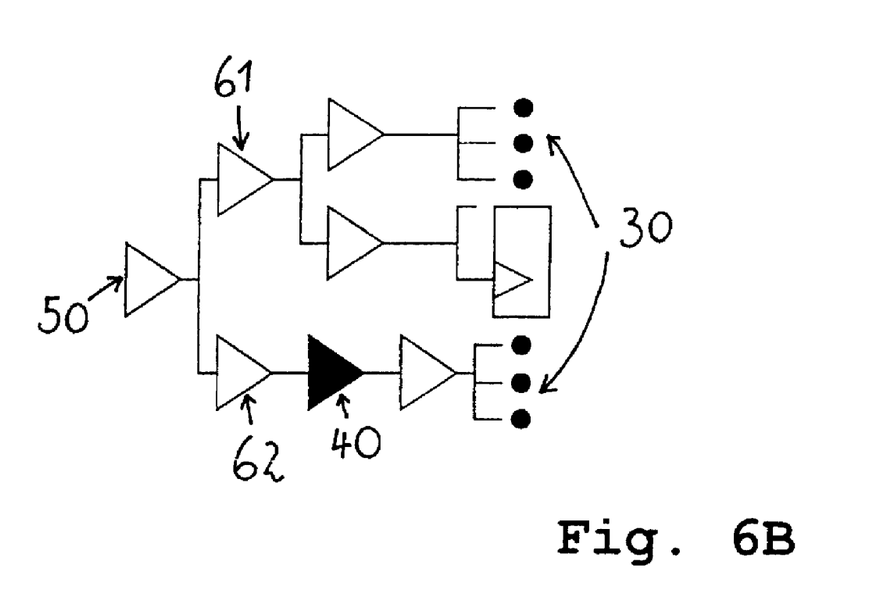

FIG. 6B shows a configuration according to the second alternative wherein the buffer 63 is removed.

The following example demonstrates the disadvantages of constructing a configuration according the state of the art:

In the first alternative unnecessary latency, i.e. additional buffers 64 and 65, is added to the main clock tree 10 and create unnecessary skew.

In the second alternative the removal of the buffer 63 is possible but in most scenarios such a removal is not possible because a sub-clock tree 20 with minimum latency is already built.

Figure 7:
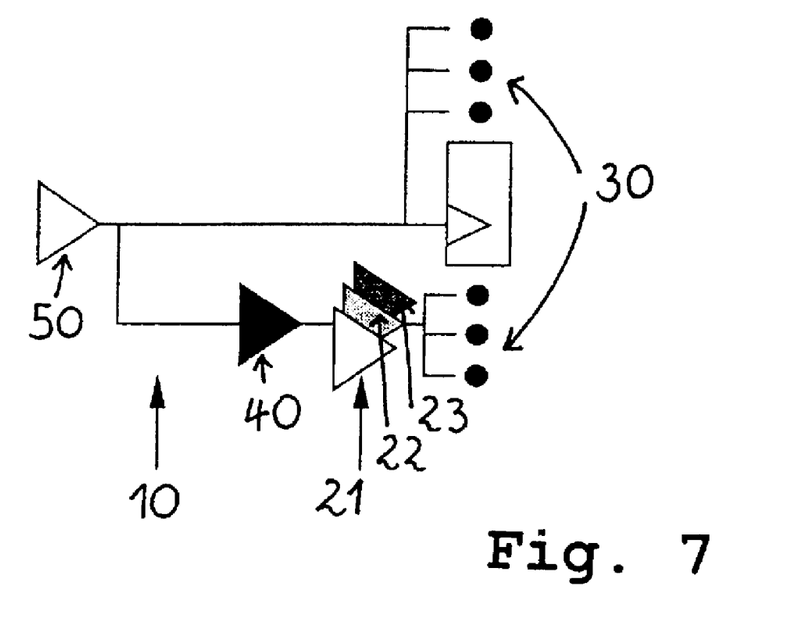
FIGS. 7, 8, and 9 illustrate an example of constructing a configuration in several steps according to an embodiment of the present invention.
Figure 8:
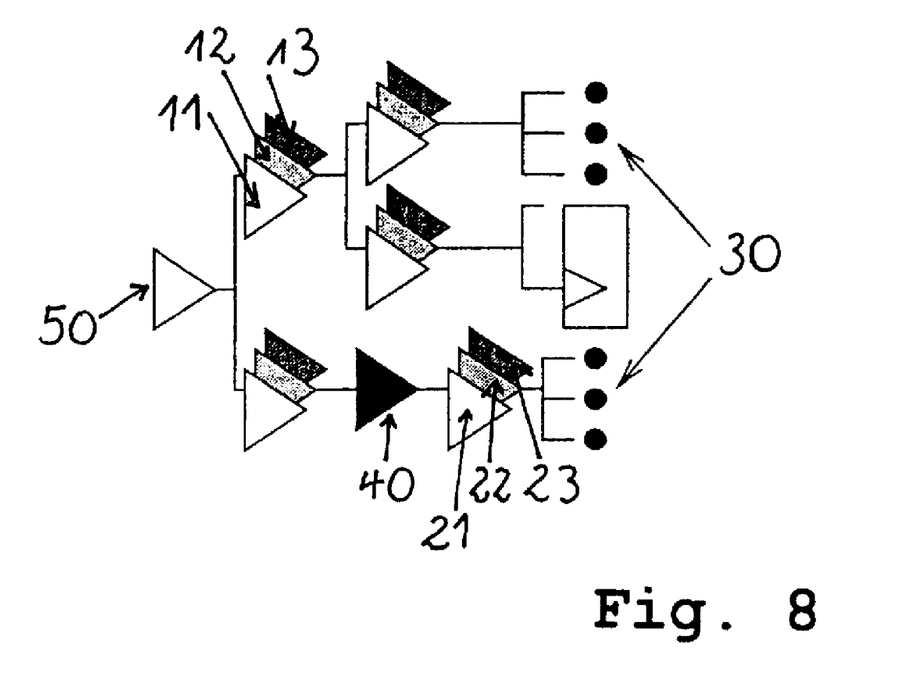
Figure 9:
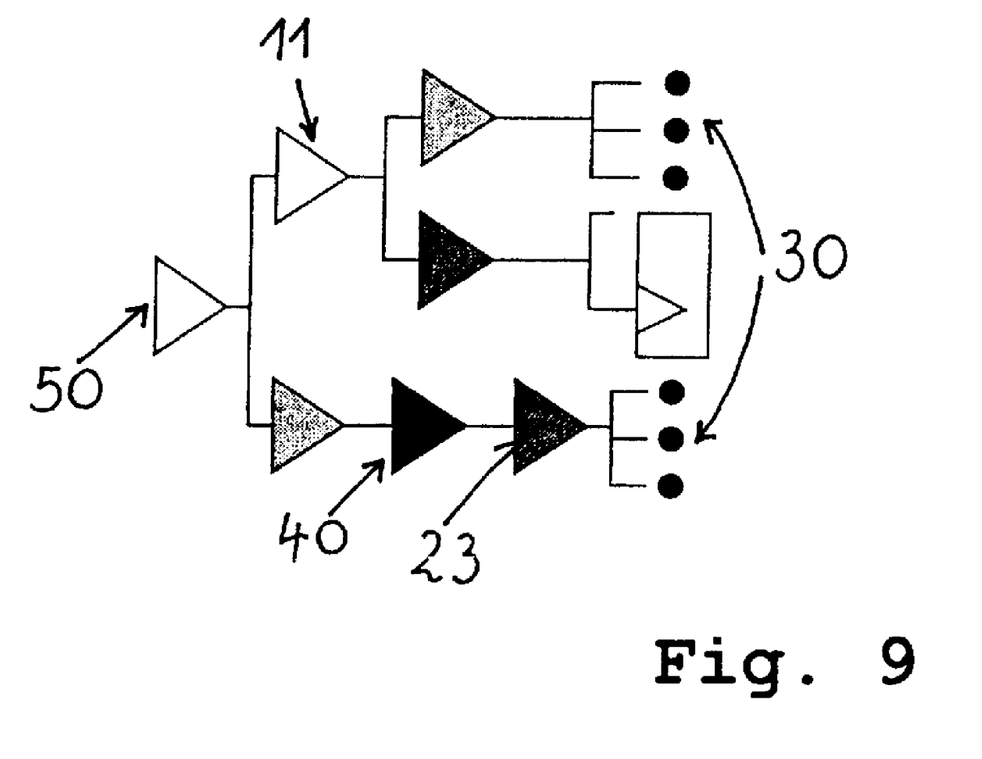

FIGS. 7-9 illustrate an example of a method of constructing a configuration according to an embodiment of the present invention.

FIG. 7 illustrates an intermediate version wherein alternative implementations 21, 22, 23 of a sub-clock tree are built. The selection of a best one is postponed to a later step. This is also called dynamic programming approach. The alternative implementations 21, 22, 23 differ for example with respect to their power level and their allowable placement area.

FIG. 8 shows a step according to the invention when alternative implementations 11, 12, 13 of the main clock tree 10 are built. While building different implementations 11, 12, 13 of the main clock tree and building different implementations 21, 22, 23 of the sub-clock tree the target arrival time windows of all sinks 30, and 31 have to be satisfied. The alternative implementations 11, 12, 13 and 21, 22, 23 are stored.

FIG. 9 shows the step when an optimal configuration has been selected, i.e. the second step of dynamic programming. The optimal configuration comprises the implementation 11 of the main clock tree 10 and the implementation 23 of the sub-clock tree 20. By this method an optimal overall solution for both the main clock tree 10 and the sub-clock tree 20 without adding unnecessary latency to the configuration is constructed.

The present invention can be realized in hardware, software, or a combination of hardware and software. Any kind of computer system or other apparatus adapted for carrying out the methods described herein is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which, when loaded in a computer system, is able to carry out these methods.

Computer program means or computer program in the present context mean any expression, in any language, code or notation, of a set of instructions intended to cause a system having an information processing capability to perform a particular function either directly or after either or both of the following:
conversion to another language, code or notation;
reproduction in a different material form.

Furthermore, the method described herein may take the form of a computer program product accessible from a computer-usable or computer-readable medium providing program code for use by or in connection with a computer or any instruction execution system. For the purposes of this description, a computer-usable or computer readable medium may be any apparatus that can contain, store, communicate, propagate, or transport the program for use by or in connection with the instruction execution system, apparatus, or device. The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk, read only memory (CD-ROM), compact disk, read/write (CD-RW), and DVD.

A possible implementation would be an extension of the EDA tool known as BonnClock, which is developed and used by IBM Corporation and the University of Bonn. The extended BonnClock tool can then create clock trees and sub-clock trees in a single program run.

DEFINITIONS 10 logic structure (clock tree, main clock tree)
20 logic structure (sub-clock tree)
11,12,13 implementation of a logic structure
21,22,23 implementation of a logic structure
30 sinks
31 sink (latch, RAM)
40 fixed circuit
50 root driver
60 buffer, inverter
61, 62, 63, 64, 65 buffer

The invention claimed is:

1. A method for optimizing the signal time behavior of an electronic circuit design comprising at least one fixed circuit element, wherein the at least one fixed circuit element is characterized by at least one of the following conditions: it cannot be cloned, it cannot be removed, it cannot be modified, said first tree being divided into a second tree and a third tree, wherein said second tree includes said at least one fixed circuit element, wherein said third tree includes no fixed circuit elements, and wherein said second tree and said third tree are coupled to each other through said at least one fixed circuit element, the method comprising:

generating one or more first alternative versions of said third tree, wherein said first alternative versions are Boolean equivalent to said third tree, and wherein a first target arrival time window is satisfied by said first alternative versions of said third tree;

generating one or more second alternative versions of said second tree, wherein said second alternative versions of said second tree are Boolean equivalent to said second tree, and wherein the latencies for the fixed circuit elements connecting said second tree and said third tree are taken into account for the generation, and wherein a second target arrival time window is satisfied by said second alternative versions of said second tree;

selecting the second alternative version of said one or more second alternative versions having the minimum signal arrival time and selecting the first alternative version of said one or more first alternative versions having the minimum signal arrival time;

replacing said second clock tree with said selected second alternative version and replacing said third clock tree with said selected first alternative version; and storing said modified circuit design in a computer.

2. The method of claim 1, wherein said second tree is a clock tree and wherein said third tree is a sub-clock tree.

3. The method of claim 1, wherein the step of generating comprises at least one of the following steps: inserting buffers;
removing buffers;
inserting inverters;
removing inverters;
duplicating non-buffers; and
duplicating non-inverters.

4. The method of claim 1, wherein at least one pruning technique is applied in the selecting step.

5. The method of claim 1, wherein in the generating step for the second alternative version of said second tree at least one of said fixed circuit elements is placed in the proximity of the center of its at least one sink.

6. The method of claim 1, wherein design constraints are satisfied for the optimization of said circuit design, said design constraints comprising at least one of the following: allowable placement areas for fixed circuit elements, maximum slew values, power level limits, energy consumption limits, or maximum latencies.

7. The method according to claim 1, wherein said second tree is a zero-skew tree with respect to its sinks.

8. A computer system comprising a non-transitory computer-readable memory unit, said memory unit containing instructions that when executed by the processor implement a method for optimizing the signal time behavior of an electronic circuit design comprising at least one fixed circuit element, wherein the at least one fixed circuit element is characterized by at least one of the following conditions: it cannot be cloned, it cannot be removed, it cannot be modified, said first tree being divided into a second tree and a third tree, wherein said second tree includes said at least one fixed circuit element, wherein said third tree includes no fixed circuit elements, and wherein said second tree and said third tree are coupled to each other through said at least one fixed circuit element, said method comprising the computer implemented steps of:

generating one or more first alternative versions of said third tree, wherein said first alternative versions are Boolean equivalent to said third tree, and wherein a first target arrival time window is satisfied by said first alternative versions of said third tree;

generating one or more second alternative versions of said second tree, wherein said second alternative versions of said second tree are Boolean equivalent to said second tree, and wherein the latencies for the fixed circuit elements connecting said second tree and said third tree are taken into account for the generation, and wherein a second target arrival time windows is satisfied by said second alternative versions of said second tree;

selecting the second alternative version of said one or more second alternative versions having the minimum signal arrival time and selecting the first alternative version of said one or more first alternative versions having the minimum signal arrival time;

replacing said second clock tree with said selected second alternative version and replacing said third clock tree with said selected first alternative version; and storing said modified circuit design in said computer.

9. A computer program product comprising:

a computer usable storage medium having a non-transitory computer readable program code embodied therein, said computer readable program code comprising an algorithm adapted to implement a method for optimizing the signal time behavior of an electronic circuit design the method comprising at least one fixed circuit element, wherein the at least one fixed circuit element is characterized by at least one of the following conditions: it cannot be cloned, it cannot be removed, it cannot be modified, said first tree being divided into a second tree and a third tree, wherein said third tree includes no fixed circuit elements, wherein said second tree includes said at least one fixed circuit element, and wherein said second tree and said third tree are coupled to each other through said at least one fixed circuit element (40), said method comprising the steps of:

generating one or more first alternative versions of said third tree, wherein said first alternative versions are Boolean equivalent to said third tree, and wherein a first target arrival time window for is satisfied by said first alternative versions of said third tree;

generating one or more second alternative versions of said second tree, wherein said second alternative versions of said second tree are Boolean equivalent to said second tree, and wherein the latencies for the fixed circuit elements connecting said second tree and said third tree are taken into account for the generation, and wherein a second target arrival time window is satisfied by said second alternative versions of said second tree;

selecting the second alternative version of said one or more second alternative versions having the minimum signal arrival time and selecting the first alternative version of said one or more first alternative versions having the minimum signal arrival time;

replacing said second clock tree with said selected second alternative version and replacing said third clock tree with said selected first alternative version to generate a modified circuit design; and storing said modified circuit design in a computer.

* * * * *